H. C. MOULTON.
GAGE FOR TESTING TAPERED HOLES.
APPLICATION FILED JUNE 25, 1913.
1,086,840.
Patented Feb. 10, 1914.
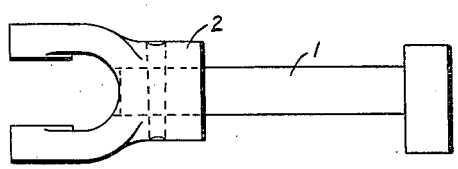
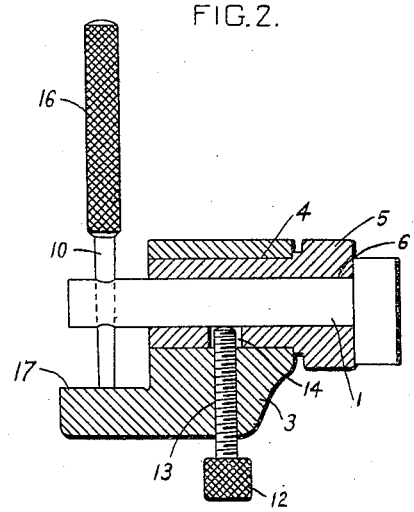
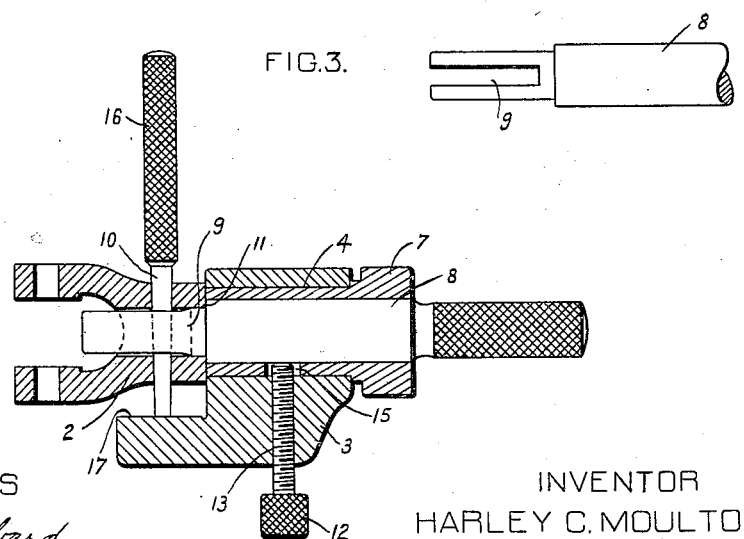
WITNESSES
N. C. Lombard
Joseph D. Ashe
INVENTOR
HARLEY C. MOULTON
BY Heard Smith & Tennant
ATTYS.

UNITED STATES PATENT OFFICE.

HARLEY C. MOULTON, OF DORCHESTER, MASSACHUSETTS, ASSIGNOR OF ONE-HALF TO WILLIAM A. HORGAN, OF BOSTON, MASSACHUSETTS.

GAGE FOR TESTING TAPERED HOLES.

1,086,840.         Specification of Letters Patent.    Patented Feb. 10, 1914.

Application filed June 25, 1913.   Serial No. 775,681.

*To all whom it may concern:*

Be it known that I, HARLEY C. MOULTON, citizen of the United States, residing at Dorchester, county of Suffolk, State of Massachusetts, have invented an Improvement in Gages for Testing Tapered Holes, of which the following description, in connection with the accompanying drawing, is a specification, like characters on the drawing representing like parts.

This invention has reference to a gage for testing tapered holes in the separate parts of a compound element more especially one which comprises two or more concentric parts secured together by a tapered pin fitting accurately in each part.

The object of the invention is to provide a device for testing the parts separately to determine if the holes are of correct size to register and form a hole having one continuous surface when the parts are put together.

Another object is to provide a device which may be used to test tapered holes in parts of different sizes.

I accomplish these and other objects as will appear from the following specification, by providing a holder, an auxiliary device or positioning member for each part which is adapted to hold such part in a definite position in the holder, a master taper pin and means preferably connected with the holder for indicating when the master pin has been inserted to a predetermined distance through the part being tested.

In the drawing in which one embodiment of my invention is illustrated Figure 1 is a side view of a compound element comprising a shaft part and a sleeve part secured together by a tapered pin fitting accurately in each part; Fig. 2 is a sectional view of my device with the shaft part of the compound element in position when being tested; Fig. 3 is a similar view with the sleeve part in similar position, and Fig. 4 is a floor view of a part of the mandrel.

Referring to the drawing in detail 1 indicates the shaft part and 2 the sleeve part of the compound element shown in Fig. 1.

3 indicates a holder which is bored as at 4 or otherwise shaped to receive and hold in a definite position the auxiliary devices which in turn receive the parts to be tested and hold them in proper position in the holder. In the construction illustrated I have shown the auxiliary device for receiving the shaft part 1 and positioning it in the holder as consisting of a bushing 5 fitting the bore 4 of the holder 3 and having a central bore 6 to receive the said shaft part. A shoulder at one end of the bushing determines its position in the holder. The shaft part is thus held with its axis coinciding with the axis of the bore of the holder.

Where shaft parts of different sizes are to be tested I provide a series of similar bushings having bores of different sizes and obviously where shaft parts of one size only are to be tested the bore of the holder may be of a size to receive the shaft parts and the bushing may be omitted.

I have shown the auxiliary device for positioning the sleeve part in the holder with its axis coinciding with the axis of the bore of the holder as comprising two parts, a bushing 7 and a mandrel 8. The mandrel 8 is slotted as shown at 9 so the master taper pin 10 may pass freely through the sleeve part and is preferably provided with a shoulder 11 against which the sleeve part 2 abuts to determine its position on the mandrel. The mandrel is preferably of such a diameter that the bushing 7 may be one of the bushings of the series above mentioned and is as shown.

A set screw 12 may be provided to clamp the shaft part 1 or the mandrel 8 carrying the sleeve part 2 firmly in position. I have shown such a set screw as fitting in a threaded hole 13 in the holder 3. The bushings 5 and 7 are shown as provided with holes 14 and 15 respectively through which the set screw 12 may pass to bear respectively against the shaft part 1 or against the mandrel 8. The master pin 10 is provided with a knurled handle 16 for convenience in handling.

To determine when the master pin 10 has been inserted to a predetermined distance I provide an indicating means on the holder preferably in the form of a stop 17 which as shown may be in the form of an integral arm extending parallel to the axis of the bore 4 of said holder and at a predetermined distance from said axis.

As will clearly appear, modifications may be made in my device without departing from the spirit of the invention.

Having described my invention what I claim as new and desire to secure by Letters Patent is:—

1. In a device for testing the size of tapered holes in two parts which are to be secured together by a tapered pin the combination of a holder, means to hold one of the parts to be tested in a definite position relative to said holder, an auxiliary holder shaped to be supported in the first holder and to sustain the other part to be tested in a definite position relative to the first mentioned holder, a master tapered pin and means for determining when the master pin has been inserted a predetermined distance through either part to be tested.

2. In a device for testing the alined tapered holes in the shaft and sleeve parts of a compound element which are to be secured together by an accurately fitting tapered pin the combination of a holder having a stop, a device for supporting the shaft part in the holder with its axis in a definite position relative to the stop, a device for supporting the sleeve part in the holder with its axis in the same definite position relative to the stop and a master tapered pin which may be inserted in the tapered hole of either part when in the holder and extend toward the stop, whereby the tapered holes may be tested to determine whether the holes will coincide to form a tapered hole having one continuous surface when the parts are put together.

3. In a device for testing the alined tapered holes in the shaft and sleeve parts of a compound element which are to be secured together by an accurately fitting tapered pin the combination of a holder shaped to receive a positioning device and hold it in a definite position, a positioning device shaped to fit into the holder and to receive and hold the shaft part of the compound element with its axis in a definite position a second positioning device shaped to fit into the holder to receive and hold the sleeve part of the compound element with its axis in the same position as that in which the axis of the shaft part was held by the first mentioned positioning device and a master tapered pin which may be inserted in the tapered holes of the parts to be tested, the holder being provided with means to determine when the master tapered pin extends to a predetermined distance through the part, whereby the tapered holes may be tested to determine if a tapered pin will fit accurately in each part when the parts are connected together.

4. In a device for testing the alined tapered holes in the shaft and sleeve parts of a compound element which are to be secured together by an accurately fitting tapered pin the combination of a holder having a stop and bored to receive a bushing in a definite position, a bushing shaped to fit in the bore of the holder and bored to receive the shaft part and hold it concentric with the bore of the holder, a device shaped to fit in the bore of the holder and shaped to receive the sleeve part and hold it concentric with the bore of the holder, a master tapered pin which may be inserted in the tapered hole of either part and extend toward the stop of the holder, whereby the parts may be tested to determine if a tapered pin will fit properly in both parts.

5. In a device for testing the alined tapered holes in the shaft and sleeve parts of a compound element which are to be secured together by an accurately fitting tapered pin the combination of a holder shaped to receive a bushing and hold it in a definite position, a bushing shaped to receive the shaft part and hold it in a definite position, a second bushing shaped to receive a mandrel and hold it in a definite position, a mandrel shaped to receive the sleeve part and hold it in a definite position, a master tapered pin which may be inserted in the tapered hole in either the shaft part or the sleeve part and means for determining when the master tapered pin has been inserted to a predetermined distance.

6. In a device for testing the alined tapered holes in the shaft and sleeve parts of a compound element which are to be secured together by an accurately fitting tapered pin the combination of a holder bored to receive a bushing in a definite position, a bushing shaped to fit in the bore of the holder and bored to receive the shaft part and hold it concentric with the bore of the holder, a second bushing shaped to fit in the bore of the holder and centrally bored to receive a mandrel, a mandrel shaped to fit in the bore of the second bushing and shaped to receive the sleeve part and hold it concentric with the bore of the holder and a master tapered pin which may be inserted in the tapered hole of either the shaft part or the sleeve part, the holder being provided with means to determine when the master tapered pin has been inserted through either part a predetermined distance.

7. In a device for testing tapered holes in shafts the combination of a holder having a stop and bored to receive a bushing, a series of bushings shaped to fit in the bore of the holder but having different sized central bores and a master tapered pin whereby different sized shafts may be held in the holder with their axes in one definite position and tapered holes therein tested by said master pin.

In testimony whereof, I have signed my name to this specification, in the presence of two subscribing witnesses.

HARLEY C. MOULTON.

Witnesses:
ELIZABETH MORRIS,
NATHAN HEARD.